United States Patent [19]
Lapham

[11] 3,820,811
[45] June 28, 1974

[54] SELF-TRACKING INDUSTRIAL TRAILER

[76] Inventor: Sidney D. Lapham, 2324 Tice Creek Dr., Manor No. 3, Walnut Creek, Calif. 94595

[22] Filed: Oct. 13, 1972

[21] Appl. No.: 297,481

[52] U.S. Cl.................. 280/99, 280/408, 280/444
[51] Int. Cl............................................ B62d 13/04
[58] Field of Search ....... 280/98, 99, 100, 103, 408, 280/443, 444

[56] References Cited
UNITED STATES PATENTS

| | | | |
|---|---|---|---|
| 2,651,526 | 9/1953 | Eubanks | 280/99 |
| 2,673,091 | 3/1954 | Planalp | 280/443 X |
| 3,077,354 | 2/1963 | Rateau | 280/99 |
| 3,337,234 | 8/1967 | Ishizuka | 280/408 X |
| 3,529,848 | 9/1970 | Harvey | 280/99 |

Primary Examiner—Richard A. Schacher
Attorney, Agent, or Firm—Phillips, Moore, Weissenberger, Lempio & Strabala

[57] ABSTRACT

A double-steered warehousing trailer is disclosed which is capable of tracking a tractor with a high degree of accuracy. Minor tracking errors can be corrected by a unique adjustability feature of the steering mechanism. The trailer is of simple construction, and it lends itself to being disassembled and reassembled for shipping and maintenance purposes without interfering with the factory adjustments of the steering mechanism.

6 Claims, 8 Drawing Figures

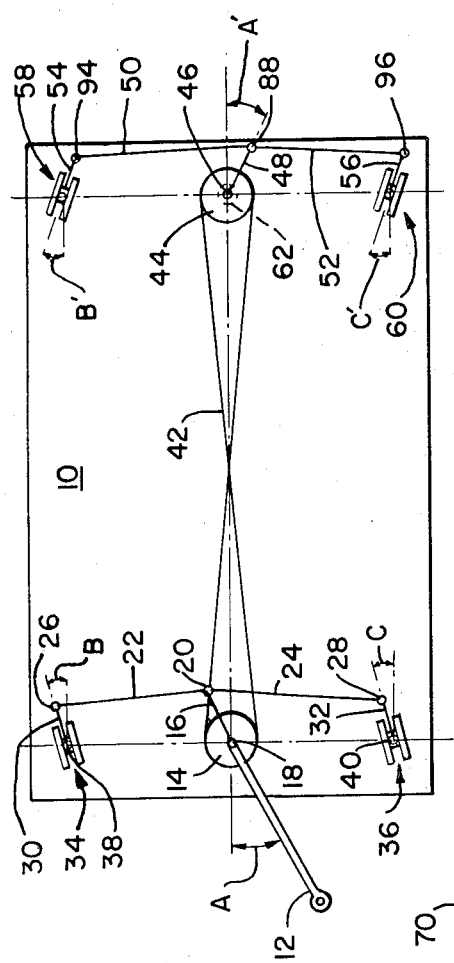
FIG—1
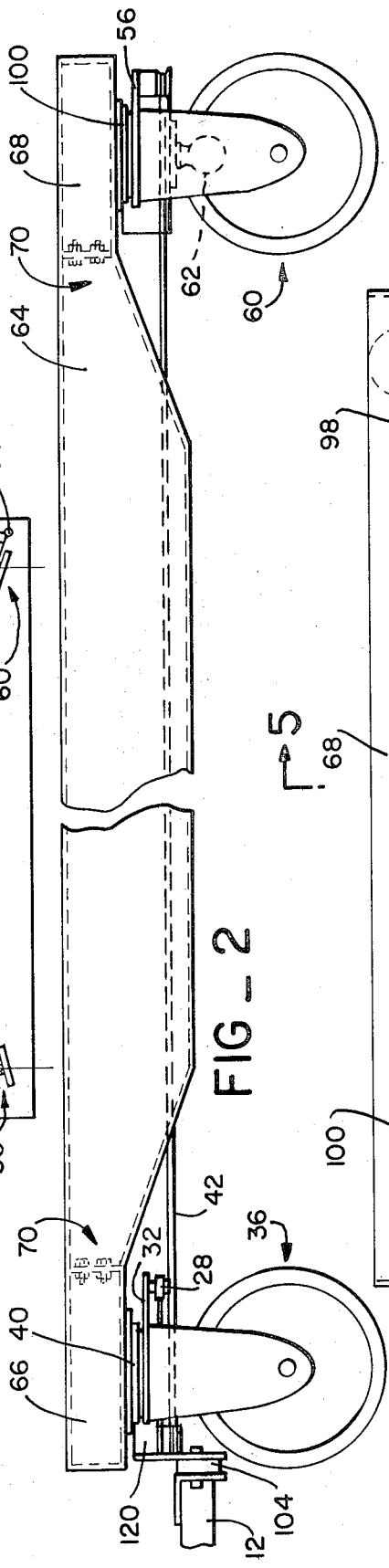
FIG—2
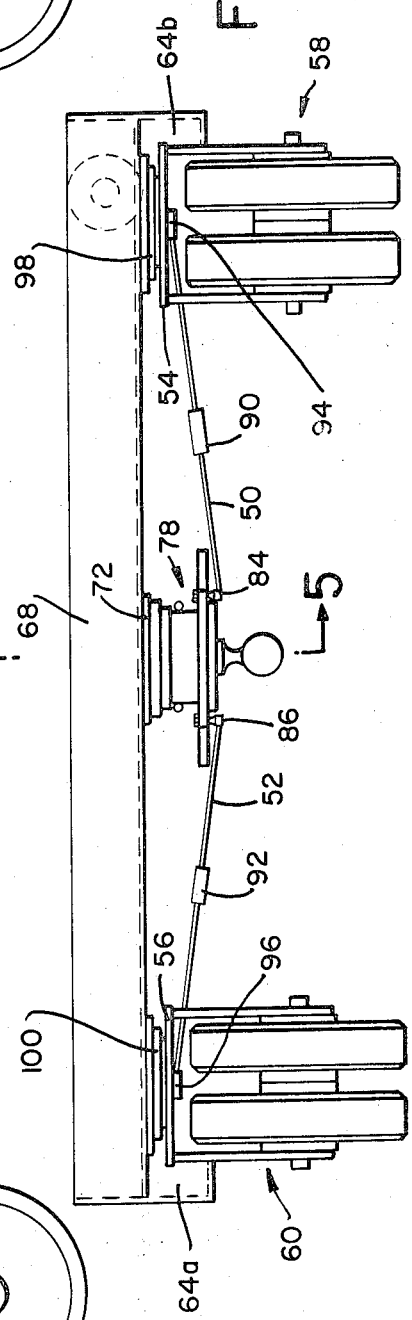
FIG—3

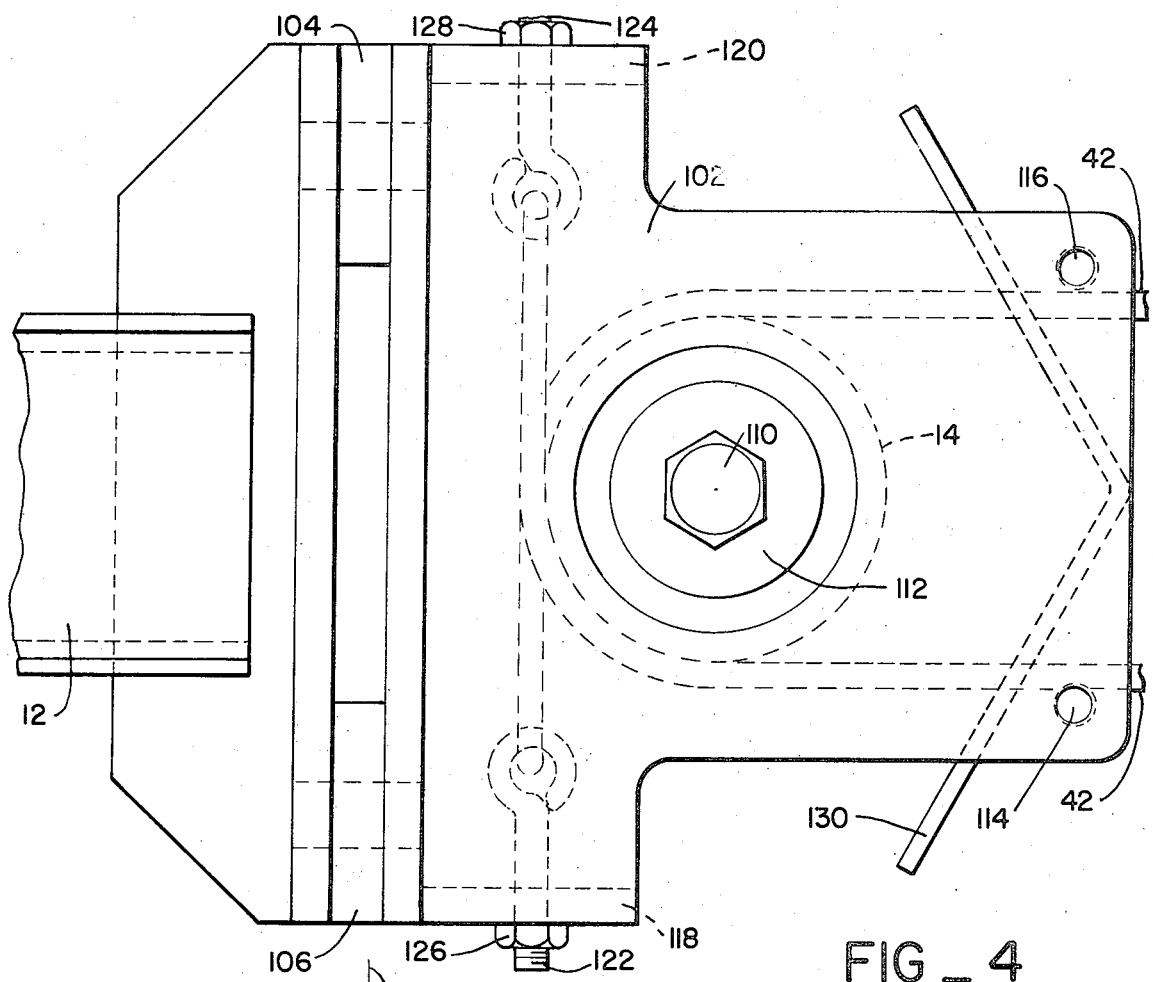
FIG_4
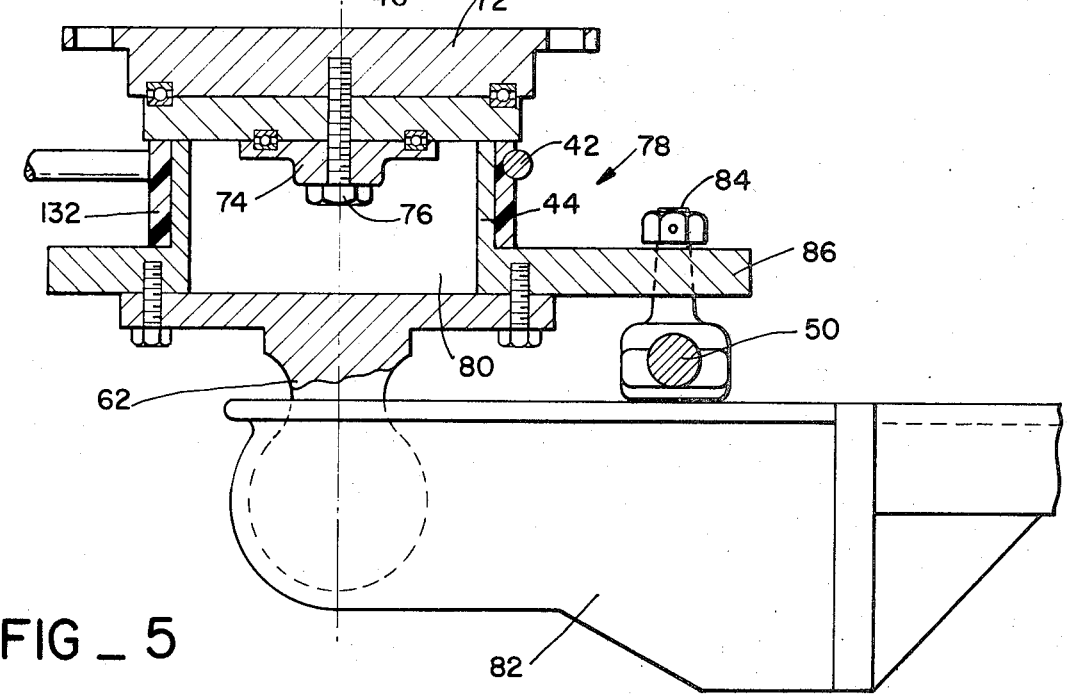
FIG_5

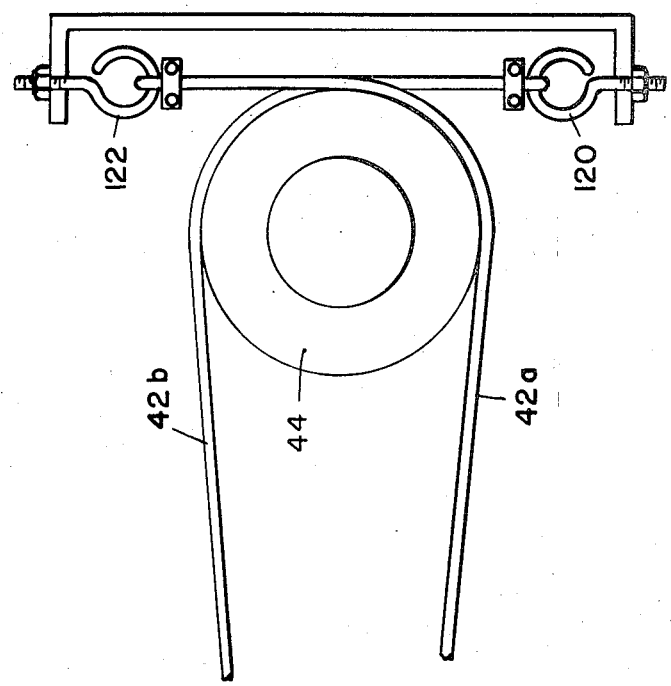
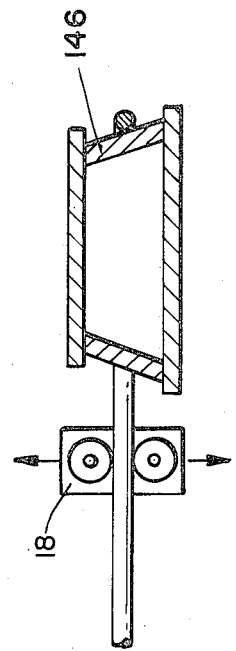
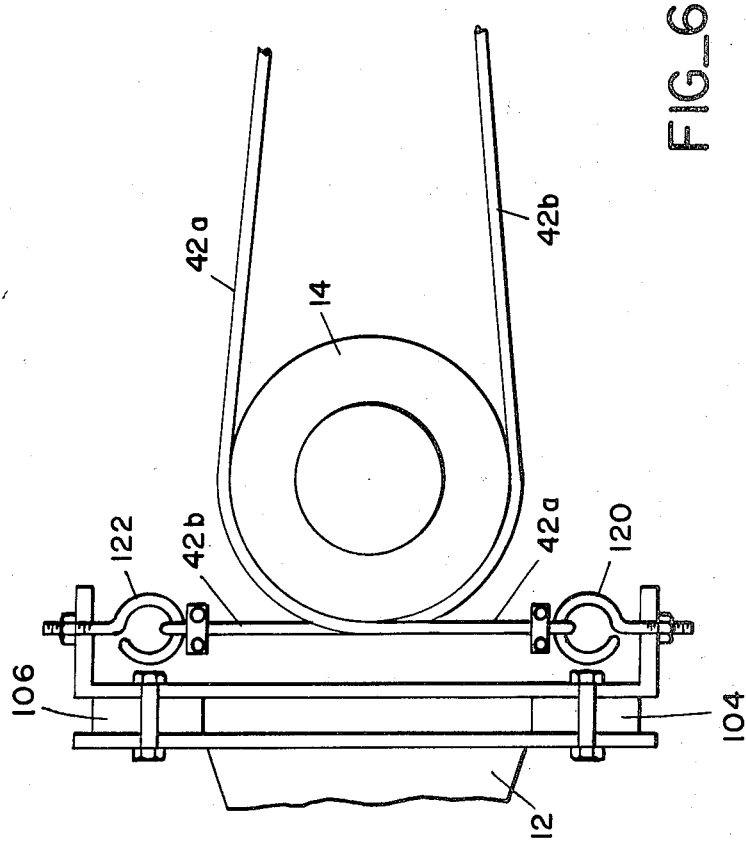
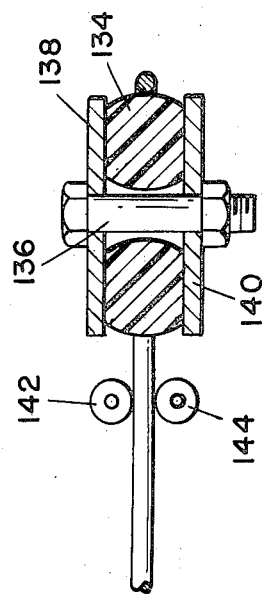

SELF-TRACKING INDUSTRIAL TRAILER

BACKGROUND OF THE INVENTION

Recent advances in warehousing systems have made it increasingly imperative for trackless towed warehousing trailers to accurately track the movements of their tractor. As the tractor makes sharp right-angle turns while moving through a network of limited-width pick aisles and intersecting aisles, the last trailer of the train cannot be allowed to deviate substantially from the path of the tractor, under penalty of striking the merchandise pallets or rack structures at the corner. Likewise, if conveyor-topped trailers are used for automatically discharging their load onto stationary conveyors, the trailers must consistently line up along the stationary conveyor with positional tolerances of only 2 or 3 inches.

Conventional warehousing trailers are of the single-steer type (one steered set of wheels and one fixed set of wheels). Studies have shown (see *Modern Materials Handling*, January 1971, pp. 48–51) that the tracking error of the sixth trailer of a typical six-trailer train is on the order of 25 percent of the tractor's turning radius on each side of the tractor's path (understeering at the beginning of the turn, and oversteering at the end of the turn). This tracking error, which is a function of the longitudinal relationships of the trailer structure, limits both the length of the train and the length of the individual trailers.

Double-steered trailers are known as such, but they have been avoided by the warehousing industry because of their complexity, and because they have only partly solved the tracking problem.

SUMMARY OF THE INVENTION

The present invention overcomes the problems of the prior art by providing a simple double-steered trailer which is easy to ship, assemble and maintain, and which solves the tracking problem virtually completely by positioning the hitch ball on the turning axis of the rear wheel set, and by allowing adjustment of the turning ratio of the front and rear wheel sets to compensate for any load-caused side slip which may become a significant factor in particular types of warehousing operations.

Because of its unique tracking ability and adjustability, the trailer of this invention is not limited in size and can in practice be built to handle two to three times the load of conventional warehousing trailers. In addition, the elimination of the train length limitation reduces the number of tractors needed to handle a given tonnage of merchandise.

It is therefore the object of the invention to provide a towed industrial trailer capable of accurately tracking the tractor when connected in a trailer train.

It is another object of the invention to provide a double-steered industrial trailer in which the hitch ball is coaxial with the turning axis of the rear steering system.

It is a further object of the invention to provide a simple double-steered trailer which is easy to ship, assemble, and maintain.

It is yet another object of the invention to provide a double-steered trailer in which the ratio of front steering to rear steering is adjustable.

BRIEF DESCRIPTION OF THE DRAWINGS

FIG. 1 is a diagrammatic view showing the mechanical relationships involved in the steering system of the trailer of this invention;

FIG. 2 is a side elevation of the trailer of this invention;

FIG. 3 is a rear end elevation of the trailer of FIG. 2;

FIG. 4 is a fragmentary underside view of the front steering mechanism;

FIG. 5 is a fragmentary vertical section along line 5—5 of FIG. 3, showing in addition the hitch of the next following trailer;

FIG. 6 is a fragmentary plan view showing the cable mounting and tensioning mechanism at the front end of the trailer; and FIGS. 7a and b are schematic vertical sections illustrating two convenient alternative methods of varying the effective diameter of the cable drum.

DESCRIPTION OF THE PREFERRED EMBODIMENT

In FIG. 1, the load-carrying frame structure of the trailer is schematically shown at 10. The trailer is towed by a hitch bar 12 which is attached to the hitch ball of a tractor (not shown) or of the next preceding trailer of the train. The hitch bar 12 is fixedly connected to the front steering drum 14 and to the front control arm 16. The front steering drum 14 is mounted to the frame structure 10 for pivotal movement about front turning axis 18.

The front control arm 16 is pivotally connected at 20 to the front tracking bars 22, 24, which are in turn pivotally connected at 26 and 28, respectively, to the steering arms 30, 32 of front wheel assemblies 34, 36. The wheel assemblies 34, 36 are mounted to the frame structure 10 for pivotal movement about axes 38 and 40, respectively.

The control arm, tracking bars, and steering arms constitute a conventional Ackermann-type steering mechanism. This mechanism is preferably adjusted so as to make angle B about 2 degrees smaller and angle C about 2 degrees greater than angle A when angle A is about 22½° (the maximum value of A for the smallest turning radius of a trailer train in the preferred design).

The rotation of the front steering mechanism is transmitted to the rear steering mechanism by a steering cable 42, which is cross-wound about front steering drum 14 and rear steering drum 44. The rear steering drum 14 is mounted to frame structure 10 for pivotal movement about rear turning axis 46. A rear control arm 48 is fixedly mounted to the rear steering drum 44, and tracking bars 50, 52 cooperate with the steering arms 54, 56 of the rear wheel assemblies 58, 60 to provide a rear steering mechanism similar to the front steering mechanism.

The rear steering mechanism is preferably adjusted so that the angles A', B', and C' have the same relationship to one another as do the angles A, B, and C of the front steering mechanism. Under normal circumstances, this adjustment will result in essentially correct tracking.

The hitch ball 62, to which the hitch bar of the next following trailer is attached, may be fixedly mounted to either the rear steering drum 44 or to the frame structure 10, as long as it is coaxial with the rear turning axis 46. Inasmuch as it is the objective of the steering arrangement of this invention to cause the front and rear turning axes to exactly follow the path laid out by the tractor's hitch ball as the trailer train moves around corners, each hitch ball provides a constantly accurate reference point for the next following trailer when the steering system is properly adjusted.

When the length of the trailer is very large compared to the length of the hitch bar 12, tracking will be essentially correct if the diameter of drums 14 and 44 is identical. However, inasmuch as the ratio of trailer length to hitch bar length is usually reasonably finite, some oversteering will tend to occur. At the same time, the traction forces acting on the trailer, particularly in a heavily loaded train, will cause it to side-slip slightly so as to produce an apparent understeering effect.

To compensate for these errors, the front and rear drums may be made of slightly different diameters; or preferably, one or both of the drums may have a variable diameter, as described hereinafter. In this manner, the rear steering mechanism may readily be adjusted to steer more or less than the front steering mechanism; i.e., the angle A' may be adjusted to be greater or smaller, by a set percentage, than the angle A. In either case, the mechanism is properly aligned when, as angle A is made = 0, all other angles are also 0.

FIG. 2 illustrates the three basic components which make the trailer of this invention unusually easy to ship, assemble and maintain: the side frame 64, the front end frame 66, and the rear end frame 68. It will be noted that the side frame 64 (consisting, as shown in FIG. 3, of side pieces 64a and 64b) supports no part of the steering mechanism, and serves no other purpose than to connect the end frames 64, 68 into a rigid frame structure 10 capable of supporting a platform (not shown) or other load-carrying structure (e.g., a conveyor), as the intended use of the trailer may dictate.

As a result, the trailer can readily be shipped in a disassembled condition (i.e., the end frames 66, 68 disassembled from the side frame 64), without risking any interference by the purchaser with the factory adjustments of the steering mechanism and wheel assemblies mounted on the end frames 66 and 68. All the purchaser need do is connect the frame members together with bolts 70, and to install the steering cable or cables 42. The desired load-carrying device can then be readily secured to the completed frame.

FIGS. 3 and 5 illustrate a preferred construction of the rear steering mechanism. Bracket 72 is attached to the underside of rear end frame 68 and supports (by means of bearing plate 74 and bolt 76) the rear steering drum assembly 78 for pivotal movement about axis 46. Bolt 76 may be attached through opening 80 and then covered up by attaching hitch ball 62 over opening 80 coaxially with axis 46. The hitch 82 of the next following trailer can be attached to hitch ball 62 in any well-known manner.

Swivel joint 84 is journalled in Ackermann plate 86, which forms part of the drum structure. Swivel joints 84 (for tracking arm 50) and 86 (for tracking arm 52, FIG. 3) constitute the pivot point 88 of FIG. 1. The tracking arms 50, 52 can be lengthened or shortened for alignment purposes by means of bidirectionally threaded fittings 90, 92. The tracking arms 50, 52 are attached to the steering arms 54, 56 of the rear wheel assemblies 58, 60 by swivel joints 94, 96. The wheel assemblies 58, 60 are pivotally mounted to the rear end frame 68 by bearing mounts 98, 100.

A similar construction is used for the front end, as shown in FIG. 4. The hitch bar 12 is mounted to the Ackermann plate 102 through resilient bumpers 104, 106 to prevent transmission of excessive shocks through the hitch. Opening 108 allows access to bolt 110 and bearing plate 112, whose functions are similar to those of bolt 76 and plate 74 in FIG. 5. Openings 114 and 116 are provided to receive the swivel joints (not shown) which connect the tracking arms 22, 24 (FIG. 1) to the Ackermann plate 102, and which together form the pivot 20 of FIG. 1.

The ends of cable 42 are secured to flanges 118, 120 by threaded eye bolts 122, 124. Lock nuts 126, 128 can be tightened to adjust the tension of cable 42 as it runs around the drums 14 and 44. A spacer bar 130 is provided to keep the cable free of the swivel joints mounted in openings 114, 116.

Although a single cable 42 may be provided as desired, a two-cable arrangement such as that shown in FIG. 6 may prove advantageous in some situations. Aside from being split into two portions 42a and 42b, the cable arrangement of FIG. 6 functions in the same manner as the cable 42 of the other figures.

As previously mentioned, the steering swing of the rear wheels with respect to that of the front wheels can be varied by making the drums 14 and 44 of slightly different diameters. A more precise and continuously variable adjustment can be provided by surrounding the drum 44 (or 14, for that matter) with a sleeve 132 (FIG. 5) of hard rubber. By tightening the cable 42, it can be made to "bite" slightly more or slightly less into the rubber sleeve, so as to vary the effective diameter of the drum 44.

Small adjustments of the drum diameter are usually all that is required. However, if larger adjustments are needed, any suitable conventional method, such as those shown in FIGS. 7a and b, may be used. FIG. 7a illustrates, as a matter of example, a hard rubber drum 134 whose diameter can be varied by tightening the bolt-and-nut arrangement 136 which holds the compression plates 138, 140 together. Fixed guides 142, 144 are provided to hold cable 42 centered on the drum 134. FIG. 7b illustrates, as another example, a conical drum 146, on which the cable 42 is properly positioned by a movable guide 148.

Although the invention has been described herein in terms of a trailer with four wheel assemblies, it will be realized that the principle is equally applicable to a tricycle gear with three wheel assemblies.

What is claimed is:

1. A self-tracking trailer, comprising:
    a. frame means;
    b. front and rear steering drums, pivotally mounted on said frame means;
    c. hitch means connected to said front steering drum for turning the same;
    d. front and rear wheel assemblies;
    e. means connected to said front steering drum to steer said front wheel assemblies;
    f. means connected to said rear steering drum to steer said rear wheel assemblies;
    g. cable means interconnecting said front and rear steering drums so as to transmit rotation of said front steering drum to said rear steering drum in the opposite direction; and h. attachment means for attaching the hitch of a succeeding trailer, said succeeding trailer hitch being freely pivotable about said attachment means;

i. said attachment means being coaxial with said rear steering drum; and j. the wheels of said wheel assemblies being pivotable about their vertical center line.

2. The trailer of claim 1, in which said means for steering said wheel assemblies include an Ackermannn-type steering mechanism.

3. The trailer of claim 1, in which the diameters of said drums are unequal.

4. The trailer of claim 1, in which the diameter of at least one of said drums is adjustable.

5. The trailer of claim 1, in which said frame means includes side frame and end frame members, and in which all parts of the steering mechanism are attached to said end frame members to the exclusion of said side frame members.

6. The trailer of claim 1, further comprising a hitch ball for attachment of the next following trailer, said hitch ball being mounted coaxially with the axis of said rear steering drum.

* * * * *